United States Patent [19]

Rifi

[11] Patent Number: 5,326,602
[45] Date of Patent: Jul. 5, 1994

[54] POLYETHYLENE BLENDS

[75] Inventor: Mahmoud Rifi, Kendall Park, N.J.

[73] Assignee: Union Carbide Chemicals & Plastics Technology Corporation, Danbury, Conn.

[21] Appl. No.: 983,652

[22] Filed: Dec. 1, 1992

[51] Int. Cl.$^5$ .................. C08K 5/01; C08L 23/08
[52] U.S. Cl. ..................... 428/35.7; 524/491; 524/523; 524/524; 525/222; 525/227
[58] Field of Search ........... 524/491, 523, 524; 525/222, 227; 428/35.7

[56] References Cited

U.S. PATENT DOCUMENTS

| | | | |
|---|---|---|---|
| 4,598,128 | 7/1986 | Randall | 525/240 |
| 4,863,769 | 9/1989 | Lustig et al. | 428/34.9 |
| 4,976,898 | 12/1990 | Lustig et al. | 264/22 |
| 5,076,988 | 12/1991 | Rifi | 264/211 |

FOREIGN PATENT DOCUMENTS

| | | |
|---|---|---|
| 410792 | 1/1991 | European Pat. Off. . |
| 297441 | 12/1988 | Japan ............... 525/222 |
| 069543 | 3/1990 | Japan ............... 524/524 |

OTHER PUBLICATIONS

Neel, "ULDPE Blends with LDPE and EUA", *Journal of Plastic Film and Sheeting* vol. 5(3) pp. 209-221 Jul. 1989.

*Primary Examiner*—David Buttner
*Attorney, Agent, or Firm*—Saul R. Bresch

[57] ABSTRACT

A pre-formed composition having essentially no yield point comprising a blend of:

(a) at least about 50 percent by weight of a copolymer of ethylene and a 4 to 8 carbon atom alpha-olefin having a density in the range of 0.880 to 0.915 gram per cubic centimeter; a melt index of no greater than about one gram per 10 minutes; long chain branching in an amount of about 0.5 to about 1.5 long chains per 1000 carbon atoms; and a molecular weight of at least about 200,000; and (b) at least about 5 percent by weight of a copolymer of ethylene and vinyl acetate or a copolymer of ethylene and ethyl acrylate, the percent by weight being based on the combined weight of components (a) and (b).

9 Claims, No Drawings

POLYETHYLENE BLENDS

TECHNICAL FIELD

This invention relates to polyethylene blends, which are competitive with plasticized polyvinyl chloride in terms of both physical properties and economics.

BACKGROUND INFORMATION

Plasticized polyvinyl chloride (P-PVC) is useful in numerous applications such as film, geomembranes, hose and tubing, and upholstery. Its most important attributes are toughness (high tensile strength), flexibility (low modulus), and elastic recovery (essentially no yield point).

The elastic recovery of a polymer, particularly, can be very important to its end-use application. Thus, a hose should be resistant to kinking when it is bent over a short radius, and it should recover (straighten out) after it is subjected to a permanent set. In the film area, especially in food packaging, e.g., meat wrap, the film should bounce back after it is depressed with a finger or other object.

P-PVC has several shortcomings, however. For example, it has a limited use temperature. P-PVC becomes brittle below 0° C. because of its high glass transition temperature (about minus 10° C.) and becomes too soft above 70° C. because of its low softening point. The plasticizers conventionally used in P-PVC tend to migrate to the surface of the polymer upon aging. This migration results in an increase in modulus and detracts from the long term performance of the P-PVC. Further, P-PVC releases toxic gases when exposed to fire and raises environmental concerns with respect to its disposal. Both the recycling and incineration of P-PVC are difficult undertakings.

The properties of P-PVC, in particular its modulus, vary with the amount of added plasticizer. As this amount is increased, the modulus of the resulting blend decreases. Consequently, P-PVC is classified according to its hardness on an A-scale as per ASTM D-2240. The hardness of the P-PVC on this scale can vary from as low as 40 for very low moduli to as high as 90 for high moduli.

In contrast, polyethylene has a very low glass transition temperature (below minus 100° C.) and a softening point above 70° C. It can be recycled with less difficulty than P-PVC and does not release toxic gases on incineration. Since the flexibility of a polyethylene product is related to its density, a plasticizer is not required for this purpose. By varying the density of the polyethylene, the hardness of any P-PVC can be achieved.

In order to provide a resin composition having physical properties comparable to P-PVC, then, the properties of toughness and recovery have to be addressed.

DISCLOSURE OF THE INVENTION

An object of this invention, therefore, is to economically provide a polyethylene composition having the requisite toughness and recovery properties, i.e., properties equivalent to P-PVC.

Other objects and advantages will become apparent hereinafter.

According to the present invention, the above object is met by a pre-formed composition having essentially no yield point comprising a blend of:
(a) at least about 50 percent by weight of a copolymer of ethylene and one or more 4 to 8 carbon atom alpha-olefins having a density in the range of 0.880 to 0.915 gram per cubic centimeter; a melt index of no greater than about one gram per 10 minutes; long chain branching in an amount of about 0.5 to about 1.5 long chains per 1000 carbon atoms; and a molecular weight of at least about 200,000; and
(b) a copolymer of ethylene and vinyl acetate or a copolymer of ethylene and ethyl acrylate.

DESCRIPTION OF THE PREFERRED EMBODIMENT(S)

A property of both the ethylene/alpha-olefin copolymer component and the blend of this invention is that they have "essentially no yield point" and have the properties of a crosslinked product (with long chain branching) even though they are not crosslinked. This phenomenon is known as "pseudo-crosslinking". When a polymer has a "yield point", it means that when the polymer is strained at or beyond its yield point, the polymer will undergo very little recovery from the strain when the stress is removed. When a polymer has "essentially no yield point", it means that when the polymer is strained, the polymer will recover its original form when the stress is removed although the recovery may not be quite one hundred percent.

The stress-strain test for yield point or absence thereof is described in ASTM D-638.

The copolymer of ethylene and one or more (preferably one) 4 to 8 carbon atom alpha-olefins can be prepared by the processes described in U.S. Pat. No. 4,302,565 and European Patent Application 0 120 501 published on Oct. 3, 1984. (The corresponding U.S. application is Ser. No. 281,927 filed on Dec. 5, 1988). Copolymers prepared using the process of U.S. Pat. No. 4,302,565, particularly the catalyst system described therein, are preferred. In this system, the respective comonomers are contacted with a catalyst system containing a catalyst precursor comprising magnesium, titanium, a halogen, and an electron donor as well as one or more aluminum containing cocatalysts such as triethylaluminum and triisobutylaluminum. In the system described in European Patent Application 0 120 501, the respective comonomers are preferably contacted with a supported catalyst system containing a catalyst precursor comprising a vanadium trihalide, an electron donor, and a hydrocarbyl aluminum halide together with a hydrocarbyl aluminum cocatalyst and a halogen substituted lower alkane promoter, the lower alkane promoter having 1 to 7 carbon atoms. Examples of the alpha-olefins are 1-butene, 1-hexene, 4-methyl-1-pentene, and 1-octene. The copolymer has a density in the range of 0,880 to 0,915 (preferably to 0.910) gram per cubic centimeter; a melt index of no greater than about one gram per 10 minutes and preferably a melt index in the range of about 0.05 to about 0.8 gram per 10 minutes; long chain branching in an amount of about 0.5 to about 1.5 long chains per 1000 carbon atoms; and a molecular weight of at least about 200,000. A "long chain" generally has about 200 to about 1000 carbon atoms.

Melt index is determined under ASTM D-1238, Condition E. It is measured at 190° C. and reported as grams per 10 minutes. The melt indices mentioned above translate into molecular weights as high as about 1,000,000. The lower melt indices (or high molecular weights) are obtained by reducing the amount of hydrogen introduced into the polymerization process.

The long chain branching can be obtained with an organic peroxide or an electron beam. The organic peroxides, which can be used for this purpose, preferably have a decomposition temperature in the range of about 100° to about 220° C. and about a 10 minute half life. Suitable organic peroxides are as follows (the decomposition temperature in °C. is given in parentheses):

Succinic acid peroxide (110), benzoyl peroxide (110), t-butyl peroxy-2-ethylhexanoate (113), p-chlorobenzoyl peroxide (115), t-butyl peroxyisobutyrate (115), t-butyl peroxyisopropyl carbonate (135), t-butyl peroxylaurate (140), 2,5-di-methyl-2,5-di(benzoyl peroxy)hexane (140), t-butyl peroxyacetate (140), di-t-butyl peroxyphthalate (140), t-butyl peroxymaleate (140), cyclohexanone peroxide (145), t-butyl peroxybenzoate (145), dicumyl peroxide (150), 2,5-dimethyl-2,5-di(t-butyl peroxy)hexane (155), t-butyl cumyl peroxide (155), t-butyl hydroperoxide (158), di-t-butyl peroxide (160), 2,5-dimethyl-2,5-di(t-butyl peroxy) hexene-3 (170), di-isopropylbenzene hydroperoxide (170), p-methane hydroperoxide (180), and 2,5-dimethyl hexane-2,5-hydroperoxide (213). Dicumyl peroxide is preferred. In order to obtain the desired long chain branching, i.e., about 0.5 to about 1.5 long chains per 1000 carbon atoms, the amount of organic peroxide used, per 100 parts by weight of ethylene/alpha-olefin copolymer, can be in the range of about 0.1 to about 5 parts by weight and is preferably in the range of about 0.5 to about 3 parts by weight.

Copolymers of ethylene and vinyl acetate (EVA) and those of ethylene and ethyl acrylate (EEA) are prepared by conventional high pressure techniques. The portion of the EVA based on vinyl acetate can be in the range of about 12 to about 60 parts by weight based on 100 parts by weight of the EVA, and is preferably in the range of about 5 to about 25 parts by weight. The portion of the EEA based on ethyl acrylate can be in the range of about 12 to about 60 parts by weight based on 100 parts by weight of EEA, and is preferably in the range of about 5 to about 25 parts by weight.

The blend contains at least about 50 percent by weight of the copolymer of ethylene and alpha-olefin, and preferably contains about 70 to about 80 percent by weight. The percent by weight is based on the total weight of the blend of components (a) and (b).

It is noted that the blend of the invention has essentially no yield point even with the addition of the liquid hydrocarbon oil discussed below.

A liquid hydrocarbon oil can be added to the blend in order to decrease modulus without significantly reducing tensile strength. The liquid hydrocarbon oil is generally a petroleum derived processing oil commonly used in the compounding and extruding of rubber compositions. The major oil type present in any of these oils can be aromatic or aliphatic. Examples of these liquid hydrocarbon oils are paraffin oils, naphthenic oils, and mineral oils. Liquid polybutene can also be included among the examples. Mixtures of the various oils can be used, if desired. The oils can have a viscosity in the range of about 100 to about 3000 SUS (Saybolt Universal Seconds) at 100° F. (37.8° C.) and preferably have a viscosity of at least about 2500 SUS at 100° F.

The ethylene/alpha-olefin copolymer, the EVA or EEA, and, optionally, the liquid hydrocarbon oil can be dry blended prior to extrusion, molding, or other form of processing (preblending) or the components can be blended in the extruder, if desired. Preblending is preferable, however, since it shortens the mixing time and is a factor in achieving uniform distribution of the various components in the blend. In the case of pelletized components, the pellets are melted prior to blending.

The amount of oil introduced into the blend can be in the range of about 5 to about 30 parts by weight of oil per 100 parts of the combined weight of the blend of ethylene/alpha-olefin copolymer and EVA or EEA. The preferred range is about 5 to about 20 parts by weight of oil per 100 parts by weight of blend.

Mixers and extruders can be used to prepare the blend. A typical extruder is described in U.S. Pat. No. 4,857,600. Mixers are exemplified by the Banbury ™ or other internal mixers, two roll mills, and Baker Perkins ™ or similar sigma blend mixers. A more detailed discussion with respect to the use of liquid hydrocarbon oil in the extrusion of low density polyethylene can be found in U.S. Pat. No. 5,076,988.

The composition of this invention can be pre-formed by various conventional techniques including extrusion, injection molding, blow molding, or slot casting. The pre-formed composition will have essentially no yield point. Because of the nature of the pre-formed composition, the composition will not only have essentially no yield point, but it will have a tensile strength of at least about 1500 psi as determined under ASTM D-638 and a modulus (1%) of less than about 20,000 as determined under ASTM D-638. The modulus is also reflected in the hardness of the pre-formed composition as determined on an A scale under ASTM D-2240 of less than about 90. These physical properties will be present regardless of orientation. It is also found that, where the pre-formed composition is a blown film, a high blow up ratio (BUR) i.e., a ratio in the range of about 4:1 to about 6:1 and a narrow die gap in the range of about 10 to about 60 mil can be used resulting in more balanced machine direction (MD) and transverse direction (TD) properties. A discussion of the blow up ratios and blown tubular film extrusion can be found in U.S. Pat. No. 4,814,135. One more characteristic of the pre-formed composition of this invention is a crystallinity of less than about 20 percent by weight, which is a product of its low density. Insofar as molecular weight distribution in the ethylene/alpha-olefin copolymer, it is found that the ratio of weight molecular weight (Mw) to number molecular weight (Mn) can be in the range of about 2:1 to about 15:1 and is preferably in the range of about 3:1 to about 10:1. The Mw/Mn ratio of the blend can be broader than the ratio for the ethylene/alpha-olefin copolymer.

As an alternative to a "yield point" determination, the physical property known as "compression set" can be determined. Compression set, which is determined under ASTM D-395-85, is defined as the amount (in percent) by which a standard test piece fails to return to its original thickness after being subjected to a standard compression load for a fixed period of time. The better the compression set, i.e., the lower the percent, the better the recovery. A compression set of less than about 40 percent can be expected with the pre-formed composition, and the compression set is preferably less than about 35 percent.

Recovery can also be expressed as the percent of the length of, for example, film, which has recovered after the film has been elongated and allowed to return to its original length. This elongation can be accomplished via an Instron ™ or similar instrument. Another technique for measuring recovery is to mount the film on a hollow cylinder in drum-like fashion, physically deforming the film by depressing it with a pointed object to a specified depth, and observing its recovery behavior. This latter technique is a common test used in industry.

Measurement of long chain branching is described in "Liquid Chromatography of Polymers and Related Materials II", edited by Cazes et al, Marcel Dekker, Inc., New York, 1980, vol. 13, pages 143 to 196.

Conventional additives can be added to the blend. The amount of additive is usually in the range of about 0.01 to about 60 percent by weight based on the total weight of the resin. Useful additives are antioxidants, ultraviolet absorbers, antistatic agents, pigments, dyes, fillers, slip agents, fire retardants, plasticizers, processing aids, lubricants, stabilizers, smoke inhibitors, and viscosity control agents.

The patent, patent applications, and publications mentioned in this specification are incorporated by reference herein.

The invention is illustrated by the following examples.

EXAMPLE 1

70 parts by weight of an ethylene/1-butene copolymer having a density of 0,883 g/cc; a melt index of about 0.05 g/10 min (flow index=2); long chain branching of about 1 long chain per 1000 carbon atoms; and a molecular weight of about 320,000 are blended in a Brabender ™ mixing head with 30 parts by weight of an ethylene/ethyl acrylate copolymer having a melt index of 20 g/10 min and containing 18 percent by weight of ethyl acrylate. The resulting blend is compression molded into a plaque and evaluated. The results of the evaluation are as follows:

| Modulus (1%) | (ASTM D-638) | 4,680 psi |
| --- | --- | --- |
| Tensile Strength | (ASTM D-638) | 2,320 psi |
| Yield Point | (ASTM D-638) | None |
| Elongation | (ASTM D-638) | 700% |
| Compression Set | (ASTM D-395-85) | 32% |

Note: the ethylene/1-butene copolymer also does not display a yield point.

EXAMPLE 2

Example 1 is repeated except that a liquid hydrocarbon oil having a viscosity of about 150 SUS at 100° F. is added to the blend in an amount of 10 parts by weight per 100 parts by weight of the blend. The results of the evaluation are as follows:

| Modulus (1%) | 3,050 psi |
| --- | --- |
| Tensile Strength | 1,865 psi |
| Yield Point | None |
| Elongation | 775% |
| Compression Set | 25% |

EXAMPLE 3

70 parts by weight of an ethylene/ 1-butene copolymer having a density of 0.902 g/cc; a melt index of about 0.1 g/10 min (flow index=7); long chain branching of about 1 long chain per 1000 carbon atoms; and a molecular weight of about 264,000 are blended in a Brabender ™ mixing head with 30 parts by weight of an ethylene/vinyl copolymer having a melt index of 0.25 g/10 min and containing 10 percent by weight vinyl acetate. The resulting blend is converted into blown film on a Sterling ™ line extruder, 3 inch die (1.5 inch screw) using a 30 mil die gap and a 4:1 blow up ration. The properties of the film (about 1.5 mil thick) are as follows:

| Modulus (1%) | |
| --- | --- |
| machine direction | 14,125 psi |
| transverse direction | 17,920 psi |
| Tensile Strength | |
| machine direction | 6,760 psi |
| transverse direction | 5,720 psi |
| Yield Point | |
| machine direction | None |
| transverse direction | None |
| Elongation | |
| machine direction | 550% |
| transverse direction | 720% |
| Tensile Impact | |
| machine direction | 1,280 ft lb/in$^3$ |
| transverse direction | 1,630 ft lb/in$^3$ |
| Dart Drop, A Scale (ASTM D-1709A) | 800 grams |
| Recovery @ 50 elongation, 10 inches/min, using an Instron ™ measuring device and measuring the length of the sample after the stress is removed: | |
| machine direction | 66 |
| transverse direction | 76 |

EXAMPLE 4

70 parts by weight of an ethylene/1-butene copolymer having a density of 0.905 g/cc; a melt index of 0.8 g/10 min; long chain branching of about 1 long chain per 1000 carbon atoms; and a molecular weight of about 230,000 are compounded with 30 parts by weight of an ethylene/vinyl acetate copolymer containing 18 percent by weight vinyl acetate and having a melt index of 2.5 g/10 min. The compounding is effected on a line having a 2.5 inch screw and a twin mixing head. The resulting blend is converted into blown film on a Sterling ™ line having a 1.5 inch screw. The die gap is 60 mil and the blow up ratio is 4:1. The properties of the film (about 1.5 mil thick) are as follows:

| Haze (ASTM D-1003) | 5% |
| --- | --- |
| Gloss, 45° (ASTM D-2457) | 62 |
| Tensile Strength | |
| machine direction | 5,040 psi |
| transverse direction | 4,070 psi |
| Modulus (1%) | |
| machine direction | 8,600 psi |
| transverse direction | 9,450 psi |
| Dart Drop, A scale | 400 grams |
| Elmendorf Tear (ASTM D-1922) | |
| machine direction | 100 grams per mil |
| transverse direction | 260 grams per mil |
| Elongation | |
| machine direction | 690% |
| transverse direction | 840% |
| Recovery @ 20% elongation, 10 inches/min | |
| machine direction | 73% |
| transverse direction | 82% |

EXAMPLE 5

Example 4 is repeated except that the compounded resin is slot casted into a 1.5 mil film at 232° C. using an Egan ™ line 1.5 inch screw. the properties of the film are as follows:

| | |
|---|---|
| Haze | 0.9% |
| Gloss, 45° | 62 |
| Tensile strength | |
| machine direction | 3700 psi |
| transverse direction | 2000 psi |
| Modulus (1%) | |
| machine direction | 8600 psi |
| transverse direction | 7520 psi |
| Dart Drop, A scale | 220 grams |
| Elmendorf Tear | |
| machine direction | 120 grams per mil |
| transverse direction | 260 grams per mil |
| Recovery @ 20% elongation, 10 inches/min | |
| machine direction | 73% |
| transverse direction | 82% |

EXAMPLE 6

The properties of the product of Example 5 are compared to a commercial plasticized polyvinyl chloride (1.5 mil) film (P-PVC) as follows:

| | Example 6 | P-PVC |
|---|---|---|
| Haze | 0.9% | <1% |
| Gloss, 45° | 62 | 85 |
| Modulus (1%) | | |
| machine direction | 8600 psi | 6200 psi |
| transverse direction | 7520 psi | 5800 psi |
| Tensile strength | | |
| machine direction | 3700 psi | 3950 psi |
| transverse direction | 2000 psi | 3400 psi |
| Elongation | | |
| machine direction | 630% | 200% |
| transverse direction | 610% | 230% |
| Elmendorf Tear | | |
| machine direction | 120 g/mil | 6 g/mil |
| transverse direction | 260 g/mil | 10 g/mil |
| Tensile impact | | |
| machine direction | 1250 ft lb/cu in | 585 ft lb/cu in |
| transverse direction | 1065 ft lb/cu in | 660 ft lb/cu in |
| Puncture | 33 in lb/mil | 12 in lb/mil |
| Recovery (% @ 10 in/min) | | |
| machine direction | 73 | 64 |
| transverse direction | 71 | 61 |

We claim:

1. A pre-formed composition having essentially no yield point comprising a blend of:
   (a) at least about 50 percent by weight of a copolymer of ethylene and one or more 4 to 8 carbon atom alpha-olefins having a density in the range of 0.880 to 0.915 gram per cubic centimeter; a melt index in the range of about 0.05 to about 0.8 gram per 10 minutes; long chain branching in an amount of about 0.5 to about 1.5 long chains per 1000 carbon atoms; and a molecular weight of at least about 200,000;
   (b) at least about 5 percent by weight of a copolymer of ethylene and vinyl acetate or a copolymer of ethylene and ethyl acrylate, the percent by weight being based on the combined weight of components (a) and (b); and
   (c) a liquid hydrocarbon oil having a viscosity in the range of about 100 to about 3000 Saybolt Universal Seconds at 100° F. is an amount of about 5 to about 30 parts by weight of oil per 100 parts of the combined weight of components (a) and (b).

2. The composition defined in claim 1 wherein only one 4 to 8 carbon atom alpha-olefin is present in the ethylene copolymer.

3. The composition defined in claim 1 wherein component (a) is present in the blend in an amount of at least about 70 percent by weight.

4. The composition defined in claim 2 wherein the alpha-olefin of component (a) is 1-butene or 1-hexene.

5. The composition defined in claim 1 in the form of a film.

6. The composition defined in claim 1 in the form of a hose or tube.

7. A shaped article comprised of the composition defined in claim 1.

8. The composition defined in claim 5 in the form of a blown film prepared at a blow up ratio in the range of about 3:1 to about 6:1.

9. A pre-formed composition having essentially no yield point comprising a blend of:
   (a) at least about 70 percent by weight of a copolymer of ethylene and 1-butene or 1-hexene having a density in the range of 0.880 to 0,915 gram per cubic centimeter; a melt index in the range of about 0.05 to about 0.8 gram per 10 minutes; long chain branching in an amount of about 0.5 to about 1.5 long chains per 1000 carbon atoms; and a molecular weight of at least about 200,000; and
   (b) at least about 5 percent by weight of a copolymer of ethylene and vinyl acetate or a copolymer of ethylene and ethyl acrylate, the percent by weight being based on the combined weight of components (a) and (b); and
   (c) additionally containing a liquid hydrocarbon oil having a viscosity in the range of about 2500 to about 3000 Saybolt Universal Seconds at 100° F. in an amount of about 5 to about 20 parts by weight of oil per 100 parts of combined weight of components (a) and (b).

* * * * *